US009258450B2

(12) United States Patent
Ogawa

(10) Patent No.: US 9,258,450 B2
(45) Date of Patent: Feb. 9, 2016

(54) FACSIMILE MACHINE AND FACSIMILE SYSTEM THAT PERFORMS FAX TRANSMISSION TO SPECIFIC TRANSMISSION DESTINATION AND PERFORM FAX RECEPTION FROM SPECIFIC SENDER PERIODICALLY

(71) Applicant: KYOCERA Document Solutions Inc., Osaka (JP)

(72) Inventor: Shinya Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/534,183

(22) Filed: Nov. 6, 2014

(65) Prior Publication Data
US 2015/0124296 A1      May 7, 2015

(30) Foreign Application Priority Data

Nov. 6, 2013  (JP) ................................. 2013-229973
Nov. 6, 2013  (JP) ................................. 2013-229974

(51) Int. Cl.
*H04N 1/32*      (2006.01)
*H04N 1/00*      (2006.01)

(52) U.S. Cl.
CPC ....... *H04N 1/32085* (2013.01); *H04N 1/00832* (2013.01); *H04N 2201/0093* (2013.01); *H04N 2201/0094* (2013.01); *H04N 2201/3202* (2013.01); *H04N 2201/3208* (2013.01); *H04N 2201/3214* (2013.01); *H04N 2201/3215* (2013.01)

(58) Field of Classification Search
None
See application file for complete search history.

(56) References Cited

U.S. PATENT DOCUMENTS

| 6,072,599 | A  | * | 6/2000 | Oba .................... | H04N 1/00204 358/400 |
| 6,266,162 | B1 | * | 7/2001 | Okamura ........... | H04N 1/00204 358/442 |
| 2007/0008593 | A1 | * | 1/2007 | Sato ........................ | H04N 1/46 358/501 |
| 2007/0206754 | A1 | * | 9/2007 | Ueda .................... | H04N 1/4446 379/201.01 |
| 2009/0122342 | A1 | * | 5/2009 | Kawano ............. | H04N 1/00244 358/1.15 |

FOREIGN PATENT DOCUMENTS

| JP | H08-223379 A | 8/1996 |
| JP | H10-023235 A | 1/1998 |
| JP | 2002-016732 A | 1/2002 |

* cited by examiner

*Primary Examiner* — Thomas D Lee
(74) *Attorney, Agent, or Firm* — Hawaii Patent Services; Nathaniel K. Fedde; Kenton N. Fedde

(57) ABSTRACT

Provided is a facsimile apparatus that prevents a transmission forgetfulness of a regular transmission. Every time a FAX is transmitted, a transmission history is accumulated in a transmission history table. A regular transmission detecting part refers to the transmission history table for every time zone corresponding to the check interval memorized in a setting table. Thereby, the regular transmission detecting part detects whether or not the regular transmission was carried out in the past. If the regular transmission is carried out, the transmission judging part refers to the transmission history table. The transmission judging part judges whether or not the regular transmission was carried out in the time zone for today. If judged the transmission being not carried out, an informing part reports that the regular transmission is not carried out to the mail address corresponding to the report destination memorized in the setting table.

15 Claims, 20 Drawing Sheets

Fig.4

| MANAGEMENT NUMBER | DESTINATION NAME | DESTINATION NUMBER | CLASSIFICATION | CONTACT (TRANSMITTING SOURCE) |
|---|---|---|---|---|
| 001 | ADDRESS A | 066-○○○ | FAX | AAA@BBB.com |
| 002 | ADDRESS B | 066-×××  | FAX | CCC@DDD.com |
| 003 | ADDRESS C | 033-△△△ | FAX | EEE@FFF.com |
| 004 | ADDRESS D | DDD@··· | I-FAX | AAA@BBB.com |

CURRENT TIME: 2013/10/31 12:00:00 THURSDAY

| TRANSMISSION DESTINATION (MANAGEMENT NUMBER) | TRANSMISSION TIME | TRANSMISSION TIME ZONE MIDNIGHT TO EARLY MORNING / MORNING / AFTERNOON / EVENING / HOLIDAY | TRANSMISSION DAY OF THE WEEK |
|---|---|---|---|
| 0 0 2 | 2013/10/31 11:15 | MORNING | THURSDAY |
| 0 1 0 | 2013/10/27 15:30 | HOLIDAY | SUNDAY |
| 0 0 4 | 2013/10/25 15:30 | AFTERNOON | FRIDAY |
| 0 0 2 | 2013/10/24 10:20 | MORNING | THURSDAY |
| 0 0 1 | 2013/10/24 09:30 | MORNING | THURSDAY |
| 0 1 7 | 2013/10/22 14:30 | AFTERNOON | TUESDAY |
| 0 1 6 | 2013/10/22 10:30 | MORNING | TUESDAY |
| 0 1 3 | 2013/10/21 13:00 | AFTERNOON | MONDAY |
| 0 0 2 | 2013/10/17 11:00 | MORNING | THURSDAY |
| 0 0 1 | 2013/10/17 10:30 | MORNING | THURSDAY |
| 0 0 9 | 2013/10/16 08:30 | MORNING | WEDNESDAY |
| 0 1 1 | 2013/10/15 10:30 | MORNING | TUESDAY |
| 0 1 8 | 2013/10/14 19:30 | EVENING | MONDAY |
| 0 0 5 | 2013/10/11 14:30 | AFTERNOON | FRIDAY |
| 0 0 1 | 2013/10/10 11:30 | MORNING | THURSDAY |
| 0 0 2 | 2013/10/10 11:15 | MORNING | THURSDAY |
| 0 1 8 | 2013/10/09 09:30 | MORNING | WEDNESDAY |
| 0 1 6 | 2013/10/09 00:15 | MIDNIGHT TO EARLY MORNING | WEDNESDAY |
| 0 1 5 | 2013/10/08 09:30 | MORNING | WEDNESDAY |
| 0 0 3 | 2013/10/03 11:30 | MORNING | THURSDAY |
| 0 0 1 | 2013/10/03 10:15 | MORNING | THURSDAY |
| 0 0 2 | 2013/10/03 10:00 | MORNING | THURSDAY |
| 0 0 8 | 2013/09/27 10:30 | MORNING | FRIDAY |
| 0 0 1 | 2013/09/26 10:30 | MORNING | THURSDAY |

Fig.6

| SETUP / CHECKING REGULAR TRANSMISSION | | 10:19 |
|---|---|---|
| SET VALUE | | |
| REFERENCE PERIOD: | ONE MONTH ▶ | 81a |
| CYCLE: | ONE WEEK ▶ | 81b |
| CHECK INTERVAL: | MORNING / AFTERNOON / EVENING / MIDNIGHT TO EARLY MORNING ▶ | 81c |
| NUMBER OF TIMES (THRESHOLD): | 3 TIMES ▶ | 81d |
| REPORT DESTINATION: | TRANSMISSION SOURCE ADDRESS ▶ | 81e |

CLOSE    OK

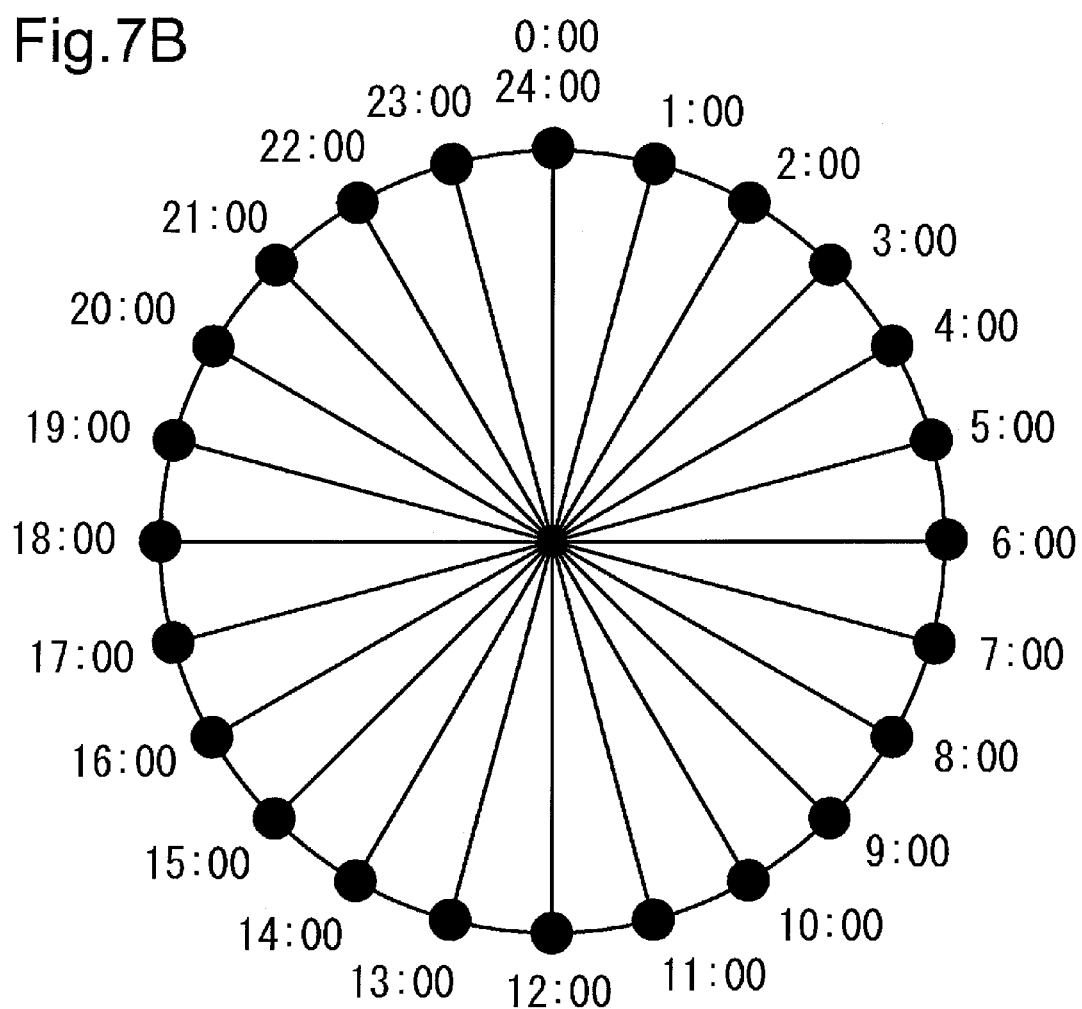

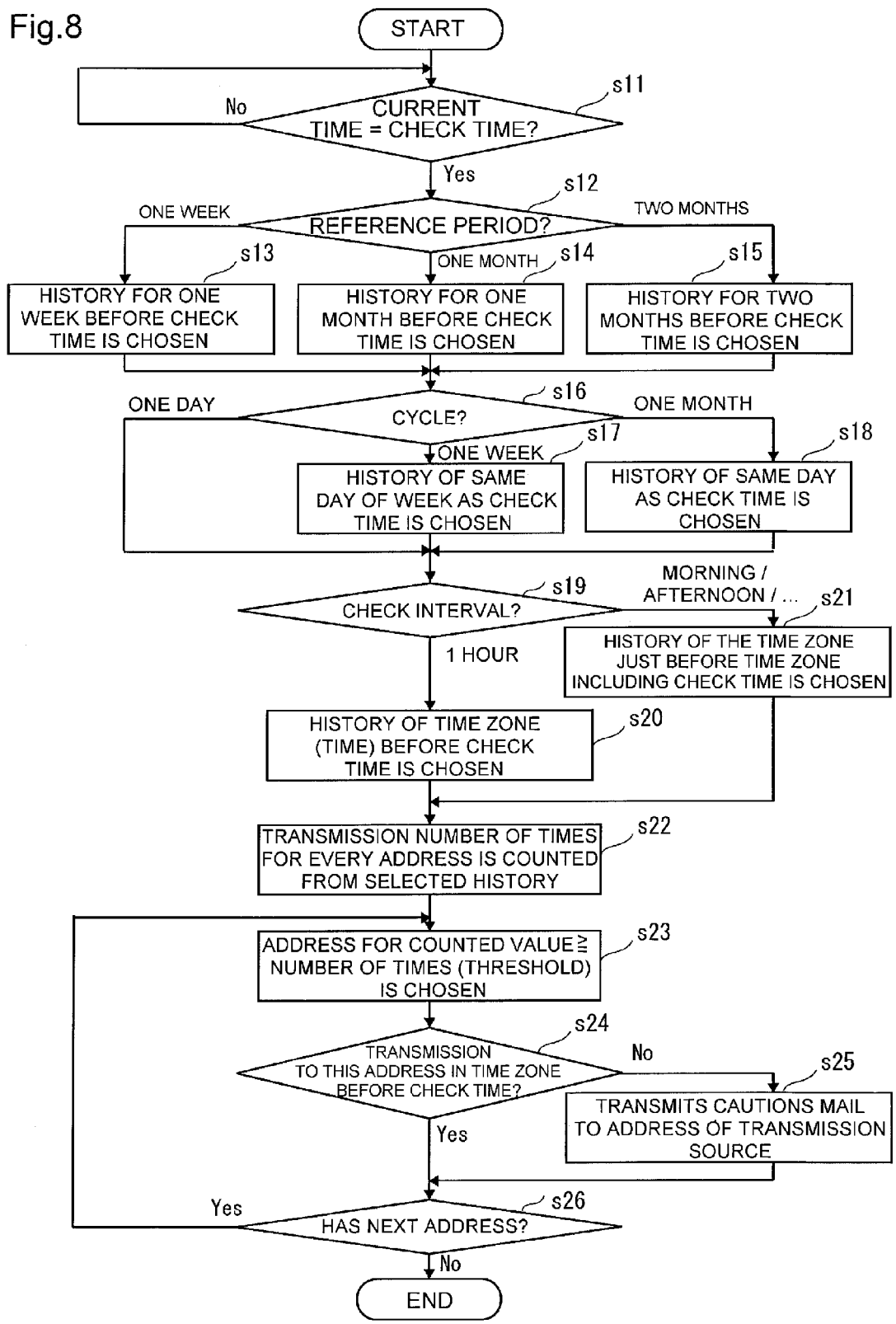

Fig.9    CURRENT TIME: 2013/10/31 12:00:00 THURSDAY

92a

| TRANSMISSION DESTINATION (MANAGEMENT NUMBER) | TRANSMISSION TIME | TRANSMISSION TIME ZONE MIDNIGHT TO EARLY MORNING / MORNING / AFTERNOON / EVENING / HOLIDAY | TRANSMISSION DAY OF THE WEEK |
|---|---|---|---|
| 002 | 2013/10/31 11:15 | MORNING | THURSDAY |
| 002 | 2013/10/24 10:20 | MORNING | THURSDAY |
| 001 | 2013/10/24 09:30 | MORNING | THURSDAY |
| 002 | 2013/10/17 11:00 | MORNING | THURSDAY |
| 001 | 2013/10/17 10:30 | MORNING | THURSDAY |
| 001 | 2013/10/10 11:30 | MORNING | THURSDAY |
| 002 | 2013/10/10 11:15 | MORNING | THURSDAY |
| 001 | 2013/10/03 10:15 | MORNING | THURSDAY |
| 002 | 2013/10/03 10:00 | MORNING | THURSDAY |

To : AAA@BBB. com
From : 1B4F_FAX@BBB. com
================
================

<< CAUTIONS >>
FOR TODAY,

TO ADDRESS B (066-OOO)

EVERY WEEK, THURSDAY AND MORNING

PLEASE VERIFY FORGETFULNESS OF REGULAR TRANSMISSION

OVER

Fig.12

CURRENT TIME: 2013/10/31 12:00:00 THURSDAY

94

| SENDER (MANAGEMENT NUMBER) | RECEPTION TIME | RECEPTION TIME ZONE MIDNIGHT TO EARLY MORNING / MORNING / AFTERNOON / EVENING / HOLIDAY | RECEPTION DAY OF THE WEEK |
|---|---|---|---|
| 002 | 2013/10/31 11:15 | MORNING | THURSDAY |
| 010 | 2013/10/27 15:30 | HOLIDAY | SUNDAY |
| 004 | 2013/10/25 15:30 | AFTERNOON | FRIDAY |
| 002 | 2013/10/24 10:20 | MORNING | THURSDAY |
| 001 | 2013/10/24 09:30 | MORNING | THURSDAY |
| 017 | 2013/10/22 14:30 | AFTERNOON | TUESDAY |
| 016 | 2013/10/22 10:30 | MORNING | TUESDAY |
| 013 | 2013/10/21 13:00 | AFTERNOON | MONDAY |
| 002 | 2013/10/17 11:00 | MORNING | THURSDAY |
| 001 | 2013/10/17 10:30 | MORNING | THURSDAY |
| 009 | 2013/10/16 08:30 | MORNING | WEDNESDAY |
| 011 | 2013/10/15 10:30 | MORNING | TUESDAY |
| 018 | 2013/10/14 19:30 | EVENING | MONDAY |
| 005 | 2013/10/11 14:30 | AFTERNOON | FRIDAY |
| 001 | 2013/10/10 11:30 | MORNING | THURSDAY |
| 002 | 2013/10/10 11:15 | MORNING | THURSDAY |
| 018 | 2013/10/09 09:30 | MORNING | WEDNESDAY |
| 016 | 2013/10/09 00:15 | MIDNIGHT TO EARLY MORNING | WEDNESDAY |
| 015 | 2013/10/08 09:30 | MORNING | WEDNESDAY |
| 003 | 2013/10/03 11:30 | MORNING | THURSDAY |
| 001 | 2013/10/03 10:15 | MORNING | THURSDAY |
| 002 | 2013/10/03 10:00 | MORNING | THURSDAY |
| 008 | 2013/09/27 10:30 | MORNING | FRIDAY |
| 001 | 2013/09/26 10:30 | MORNING | THURSDAY |

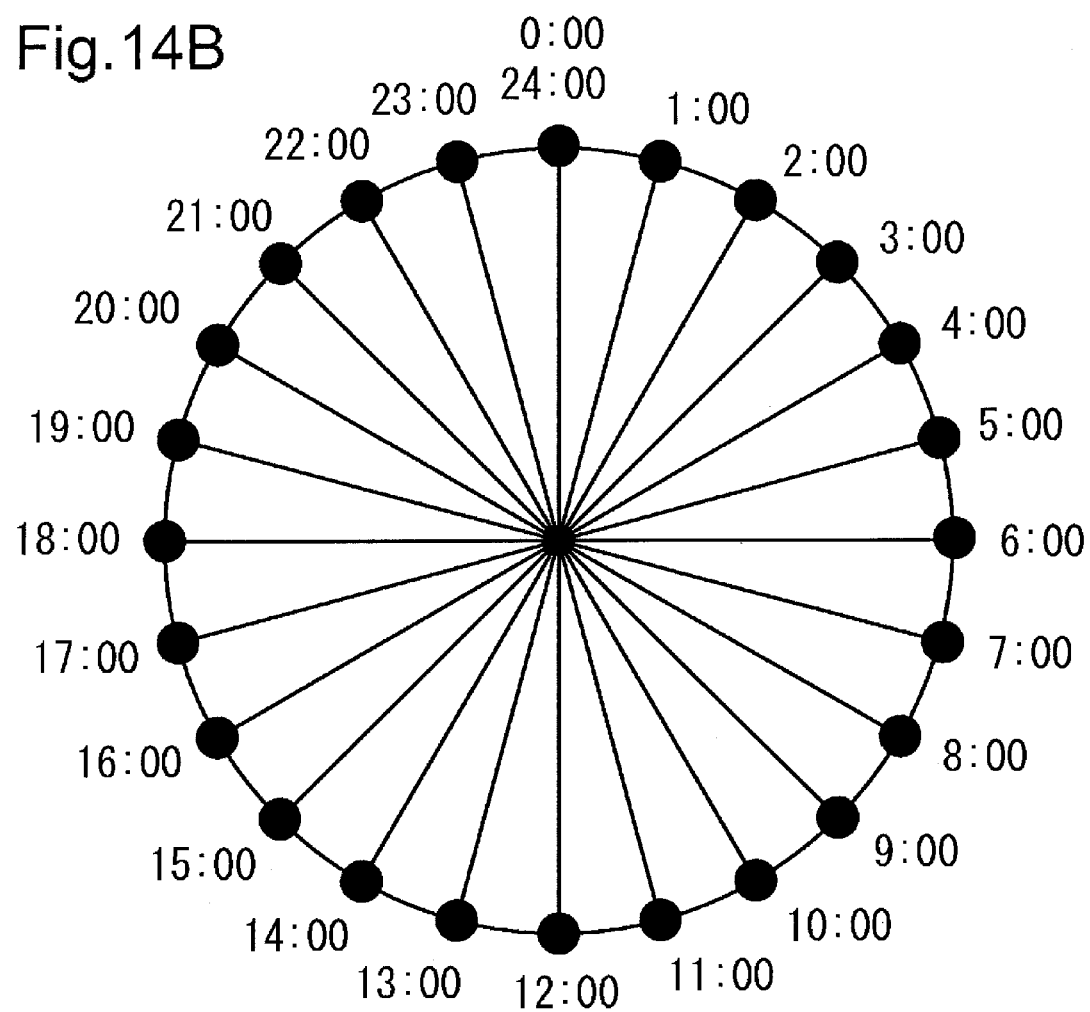

| MANAGEMENT NUMBER | TRANSMITTING PERSON NAME | DESTINATION NUMBER | CLASSIFICATION | CONTACT (RECIPIENT) |
|---|---|---|---|---|
| 001 | SENDER A | 066-○○○ | FAX | AAA@BBB.com |
| 002 | SENDER B | 066-××× | FAX | CCC@DDD.com |
| 003 | SENDER C | 033-△△△ | FAX | EEE@FFF.com |
| 004 | SENDER D | DDD@··· | I-FAX | AAA@BBB.com |

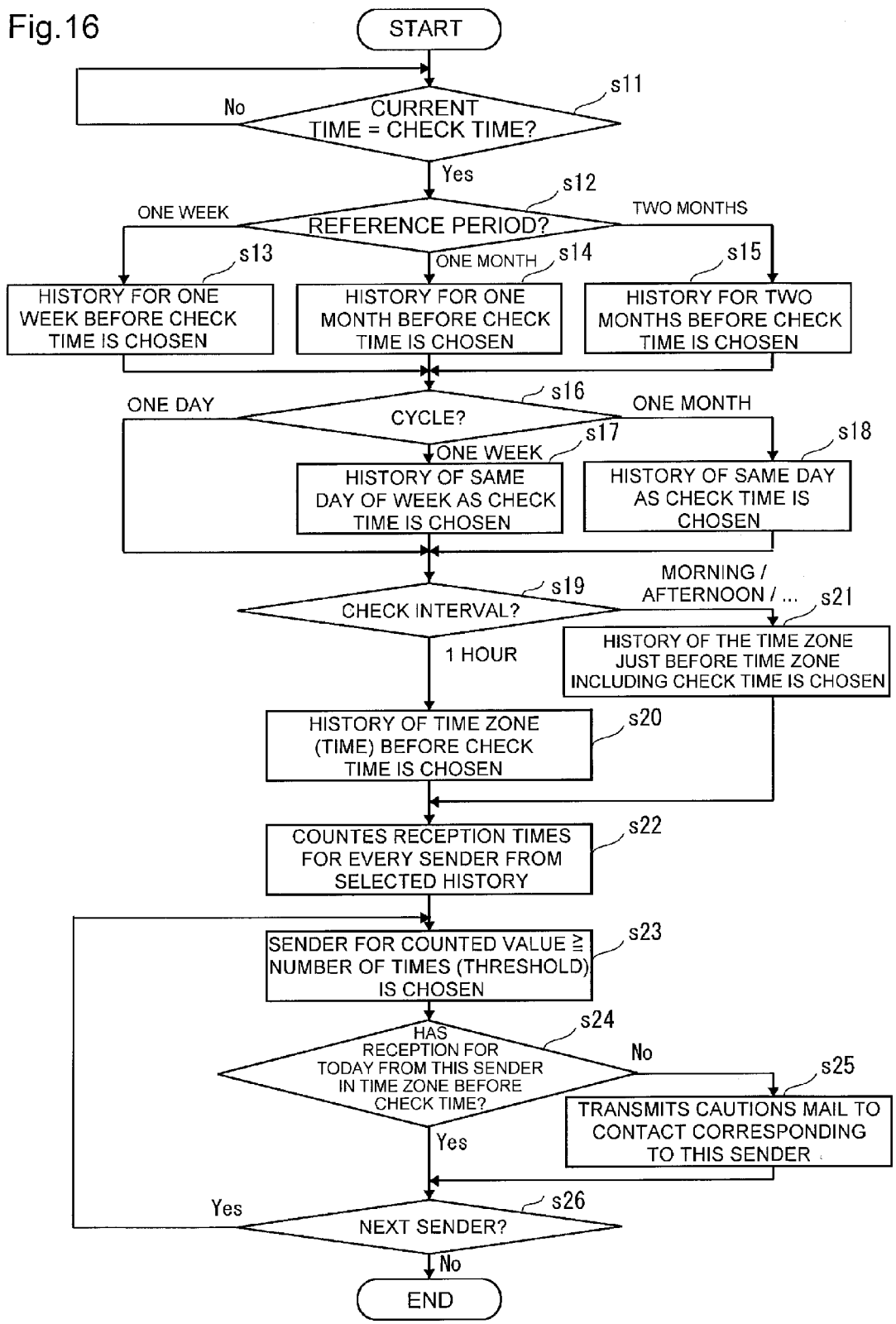

Fig. 17    94a    CURRENT TIME: 2013/10/31 12:00:00 THURSDAY

| SENDER (MANAGEMENT NUMBER) | RECEPTION TIME | RECEPTION TIME ZONE MIDNIGHT TO EARLY MORNING / MORNING / AFTERNOON / EVENING / HOLIDAY | RECEPTION DAY OF THE WEEK |
|---|---|---|---|
| 0 0 2 | 2013/10/31 11:15 | MORNING | THURSDAY |
| 0 0 2 | 2013/10/24 10:20 | MORNING | THURSDAY |
| 0 0 1 | 2013/10/24 09:30 | MORNING | THURSDAY |
| 0 0 2 | 2013/10/17 11:00 | MORNING | THURSDAY |
| 0 0 1 | 2013/10/17 10:30 | MORNING | THURSDAY |
| 0 0 1 | 2013/10/10 11:30 | MORNING | THURSDAY |
| 0 0 2 | 2013/10/10 11:15 | MORNING | THURSDAY |
| 0 0 1 | 2013/10/03 10:15 | MORNING | THURSDAY |
| 0 0 2 | 2013/10/03 10:00 | MORNING | THURSDAY |

Fig. 18

```
To:AAA@BBB.com
From:1B4F_FAX@BBB.com
===================
===================

<< CAUTIONS >>
FOR TODAY,

┌─────────────────────────────────┐
│ FROM SENDER B (066-OOO),        │
└─────────────────────────────────┘

┌─────────────────────────────────┐
│ EVERY WEEK, THURSDAY AND        │
│ MORNING                         │
└─────────────────────────────────┘

PLEASE VERIFY FORGETFULNESS
OF REGULAR RECEPTION

OVER
```

83b

FACSIMILE MACHINE AND FACSIMILE SYSTEM THAT PERFORMS FAX TRANSMISSION TO SPECIFIC TRANSMISSION DESTINATION AND PERFORM FAX RECEPTION FROM SPECIFIC SENDER PERIODICALLY

INCORPORATION BY REFERENCE

This application is based on and claims the benefit of priority from Japanese Patent Application No. 2013-229973 filed on Nov. 6, 2013, and Japanese Patent Application No. 2013-229974 filed on Nov. 6, 2013, the contents of which are hereby incorporated by reference.

BACKGROUND

The present disclosure relates a facsimile apparatus and a facsimile system that FAX transmission is periodically performed to a specific transmission destination and FAX reception is periodically performed from a specific sender.

In a typical case, a facsimile machine (FAX) is used for a means to send an order of goods, a documents of a business negotiation, or the like, to a specific destination periodically, as regular business. As such typical FAX equipment, specifying a transmission destination and transmission time previously at the transmitting side is proposed for regular business. In such technology, a manuscript image memorized in the FAX previously is automatically transmitted to the specified transmission destination at the instructed time.

SUMMARY

A facsimile apparatus of the present disclosure includes a transmission history table, a regular transmission detecting part, a transmission judging part, and an informing part. As for the transmission history table, a transmission history in which a transmission destination and transmission time are included for every facsimile transmission is accumulated. The regular transmission detecting part detects a time zone when a regular transmission has been carried out within the time zones set up previously based on the transmission history. The transmission judging part, in the time zone when the regular transmission is detected by the regular transmission detecting part, judges whether or not the regular transmission is carried out in the detected time zone for today based on the transmission history. The informing part, if judged as the regular transmission not being carried out by the transmission judging part, notifies a predetermined report destination that the regular transmission is not carried out.

Also, a facsimile apparatus of the present disclosure includes a reception history table, a regular reception detecting part, a reception judging part, and an informing part. As for a reception history table, a reception history in which a sender and a reception time are included for every facsimile reception is accumulated. The regular reception detecting part detects the time zone when a regular reception has been carried out within the time zones set up previously based on the reception history. The reception judging part, the time zone when the regular reception is detected by the regular reception detecting part, judges whether or not the regular reception is carried out in the detected time zone for today based on the reception history. The informing part, if judged as the regular reception not being carried out by the reception judging part, notifies a predetermined report destination that the regular reception is not carried out.

Also, a facsimile system of the present disclosure includes a terminal for a user and a facsimile apparatus. The facsimile apparatus includes a transmission history table, a regular transmission detecting part, a transmission judging part, and an informing part. As for a transmission history table, a transmission history in which a transmission destination and transmission time are included for every facsimile transmission is accumulated. The regular transmission detecting part detects a time zone when regular transmission has been carried out within the time zones set up previously based on the transmission history. The transmission judging part, in the time zone when the regular transmission is detected by the regular transmission detecting part, judges whether or not the regular transmission is carried out in the detected time zone for today based on the transmission history. The informing part, if judged as the regular transmission not being carried out by the transmission judging part, notifies to the terminal that the regular transmission is not carried out.

BRIEF DESCRIPTION OF THE DRAWINGS

FIG. 4 shows an example of an address book table as shown in FIG. 3.

FIG. 5 shows an example of a transmission history table as shown in FIG. 3.

FIG. 6 shows an example of a check function setting screen of the regular transmission displayed on the operation part as shown in FIG. 3.

FIG. 7B is an image figure indicating a check interval set up in the check function setting screen of a regular transmission as shown in FIG. 6.

FIG. 8 is a flow chart that indicates a process flow of the image forming apparatus as shown in FIG. 3.

FIG. 9 is a figure indicating a transmission history judged as the regular transmission in the transmission history tables as shown in FIG. 5.

FIG. 10 shows an example of e-mail transmitted to a sender, if the regular transmission is not transmitted.

FIG. 12 shows an example of a reception history table as shown in FIG. 11.

FIG. 14B is an image figure indicating a check interval set up in the check function setting screen of a regular reception as shown in FIG. 13.

FIG. 16 is a flow chart that indicates a process flow of the image forming apparatus indicated in FIG. 11.

FIG. 17 is a figure indicating the reception history judged as the regular reception in the reception history tables as shown in FIG. 12.

FIG. 18 shows an example of e-mail transmitted to a recipient, if the regular reception is not received.

DETAILED DESCRIPTION

[First Embodiment]

Subsequently, an embodiment of the present disclosure is described in detail as refer to drawings.

Figure 1:
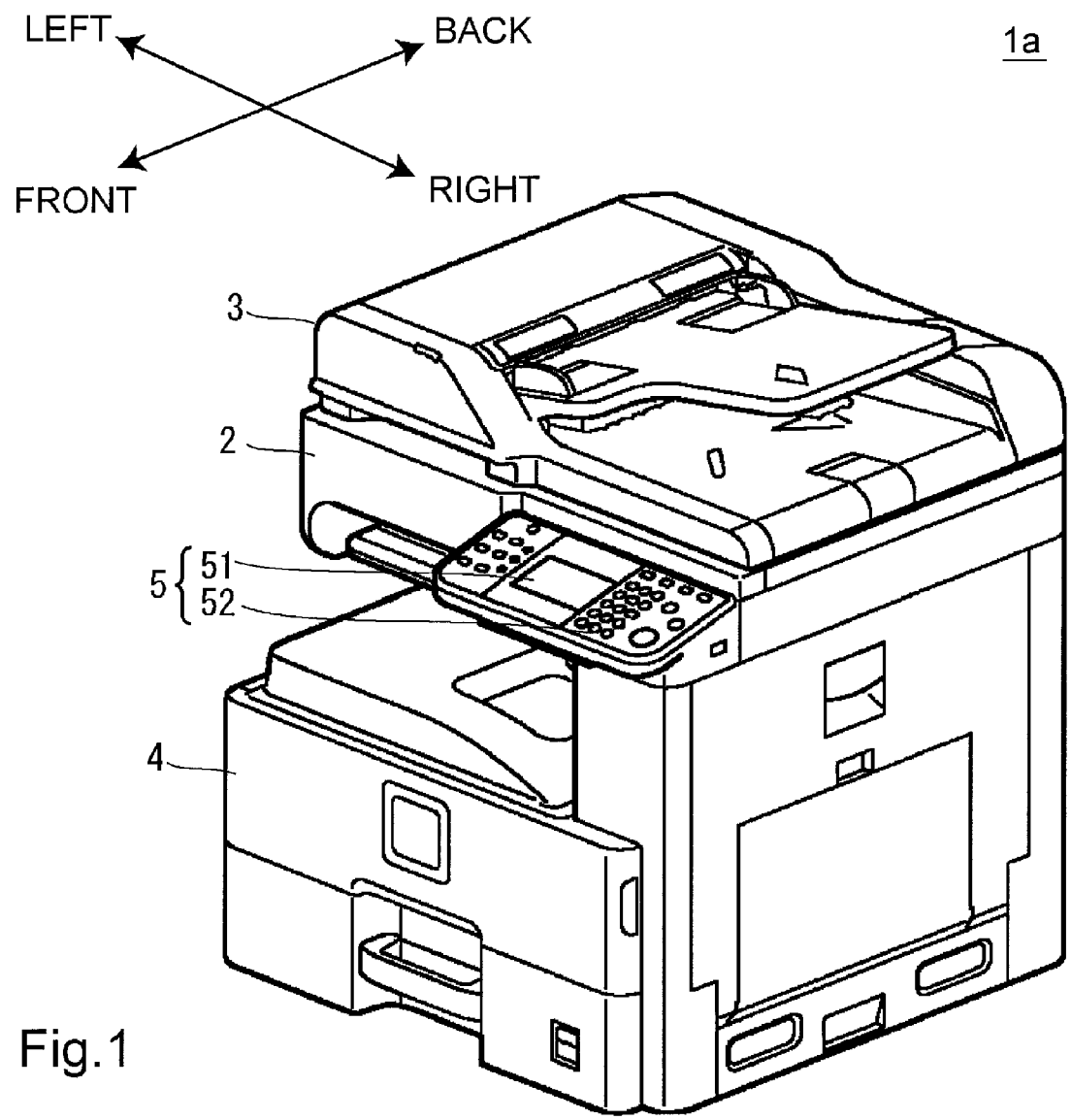
FIG. 1 is an appearance perspective view of an image forming apparatus related to a first embodiment of the present disclosure.

An image forming apparatus 1a of the present embodiment is an apparatus for forming an images, such as a copying machine, a scanner, and a MFP (Multi-Functional Peripheral). As refer to FIG. 1, the image forming apparatus 1a includes a manuscript reading part 2, a manuscript feeding part 3, a body part 4, and an operation part 5. A manuscript reading part 2 is allocated in the upper part of the body part 4. A manuscript feeding part 3 is allocated in the upper part of the manuscript reading part 2.

In front of side of the image forming apparatus 1a, an operation part 5 that carries out a setup and instructions of operation for the image forming apparatus 1a is allocated.

The operation part 5 includes a liquid crystal display part 51 and a manual operation button 52. When a user operates the operation part 5, instructions are input.
Thereby, a various kinds of setup for the image forming apparatus 1a is carried out, and various functions, such as image formation, are performed. The liquid crystal display part 51 can indicate a state of the image forming apparatus 1a or can display an image formation situation and number of prints. The liquid crystal display part 51 can use as a touch panel, and various setup can be carried out, such as function of double-side printing, a black/white inversion, magnification setup, a concentration setup, or the like. The manual operation button 52 includes a start button, a stop/clear button, a reset button, a numeric keypad, or the like. The start button is a button that a user directs starts an image formation. The stop/clear button is a button used when stopping the image formation. The reset button is a button used when making the various setup of image forming apparatus 1a into a default.

Figure 2:
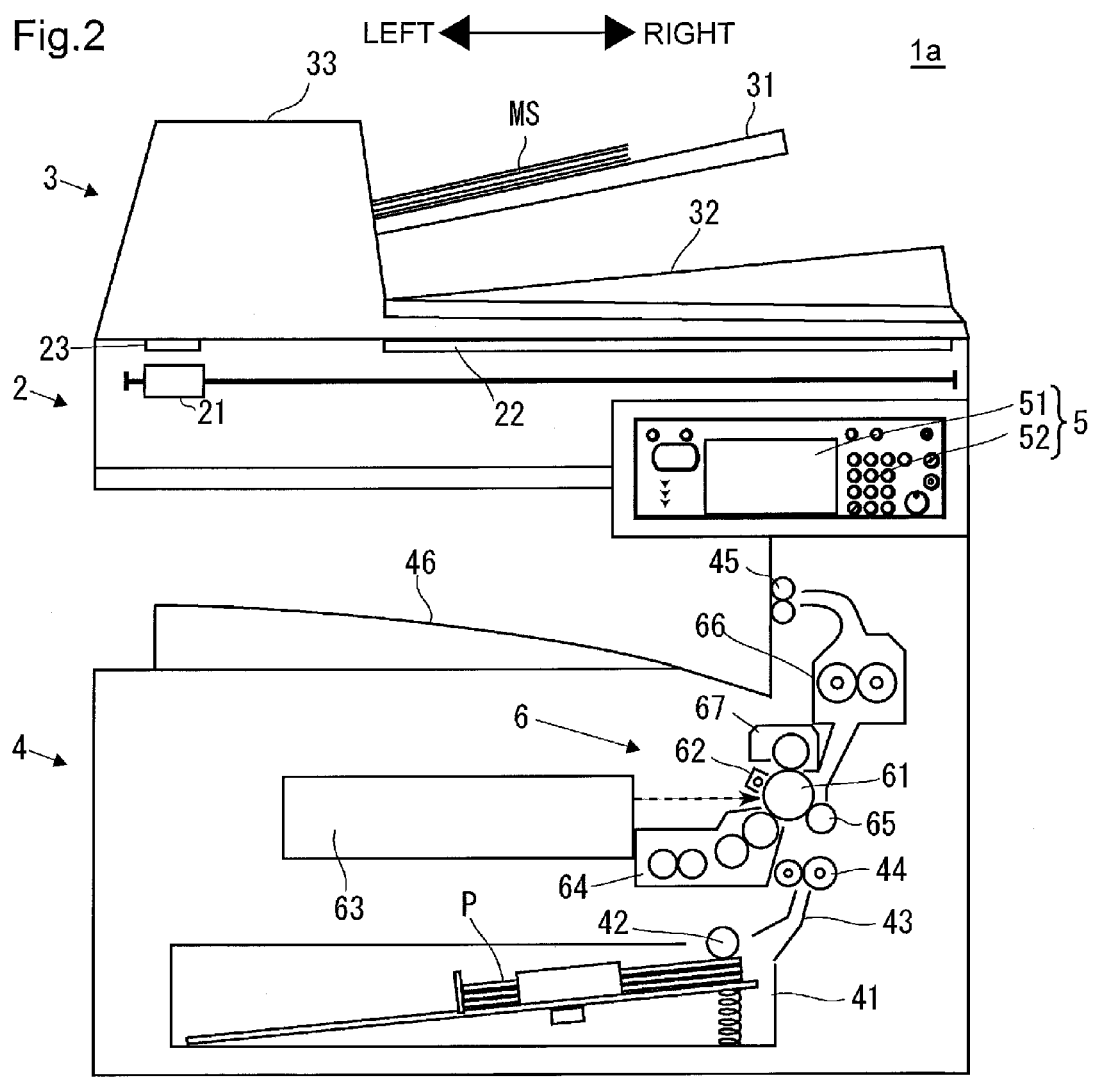
FIG. 2 is a cross section indicating an internal configuration of the image forming apparatus as shown in FIG. 1.

As refer to FIG. 2, the manuscript reading part 2 includes a scanner 21, a platen glass 22, and a manuscript reading slit 23. The scanner 21 has an exposure lamp, an optical image sensor, or the like. The scanner 21 can be movable by a feeding direction of a manuscript by the manuscript feeding part 3. The platen glass 22 is a manuscript stand having a transparent member. The manuscript reading slit 23 is a slit formed in an orthogonal orientation of the feeding direction of the manuscript MS by the manuscript feeding part 3.

If it reads the manuscript MS placed in the platen glass 22, the scanner 21 is moved to a position that faces the platen glass 22. The scanner 21 reads the manuscript MS with scanning the manuscript placed in the platen glass 22 and acquires an image data. The scanner 21 outputs the acquired image data to the body part 4. If it reads the manuscript MS fed by the manuscript feeding part 3, the scanner 21 is moved to the position that faces the manuscript reading slit 23. In this case, via the manuscript reading slit 23, the scanner 21 reads the manuscript MS and acquires image data with synchronizing feed operation of the manuscript MS by the manuscript feeding part 3. Also, the scanner 21 outputs the acquired image data to the body part 4.

The manuscript feeding part 3 is an ADF (Auto Document Feeder). The manuscript feeding part 3 includes a manuscript mounting part 31, a manuscript discharging tray 32, and a manuscript feeding mechanism 33. The manuscript MS placed in the manuscript mounting part 31 is fed one sheet at a time in order by the manuscript feeding mechanism 33 and conveyed to a position that faces the manuscript reading slit 23. After that, the manuscript MS is discharged to the manuscript discharging tray 32.

A body part 4 includes a printing part 6. Also, the body part 4 includes a feeding part 41, a feed roller 42, a paper sheet conveying path 43, a conveying roller 44, and an ejection roller 45. The feeding part 41 is a sheet paper cassette that stores two or more sheets of recording papers P. The feed roller 42 lets out one sheet of the recording paper P at a time from the feeding part 41 to the paper sheet conveying path 43. The recording paper P, which is let out by the feed roller 42 to the paper sheet conveying path 43, is conveyed to a printing part 6 by the conveying roller 44. Then, the recording paper P record is carried out by the printing part 6 is discharged by the ejection roller 45 to a ejection space 46 formed between the manuscript reading part 2 and the body part 4. Thus, the feed roller 42, the conveying roller 44, and the ejection roller 45 function as a conveying part of the recording paper P.

The printing part 6 includes a photo conductor drum 61, a charging part 62, an exposure part 63, an image formation part 64, a transfer part 65, a fixing part 66, and a cleaning part 67. The exposure part 63 is an optical unit having a laser device, a mirror, or the like. The exposure part 63 outputs and exposes a laser beam based on the image data to the photo conductor drum 61, which is uniformly electrified, by the charging part 62. Thereby, an electrostatic latent image is formed in a surface of the photo conductor drum 61. The image formation part 64 is a development unit that develops the electrostatic latent image formed in the photo conductor drum 61 by using toner. The image formation part 64 makes a toner image form based on the electrostatic latent image on the photo conductor drum 61. The transfer part 65 makes the recording paper P transfer the toner image formed on the photo conductor drum 61 of the image formation part 64. The fixing part 66 heats the recording paper P, which the toner image is transferred by the transfer part 65, and thus fixes the toner image to the recording paper P. Then, the toner that remains on the photo conductor drum 61 is removed by the cleaning part 67.

Figure 3:
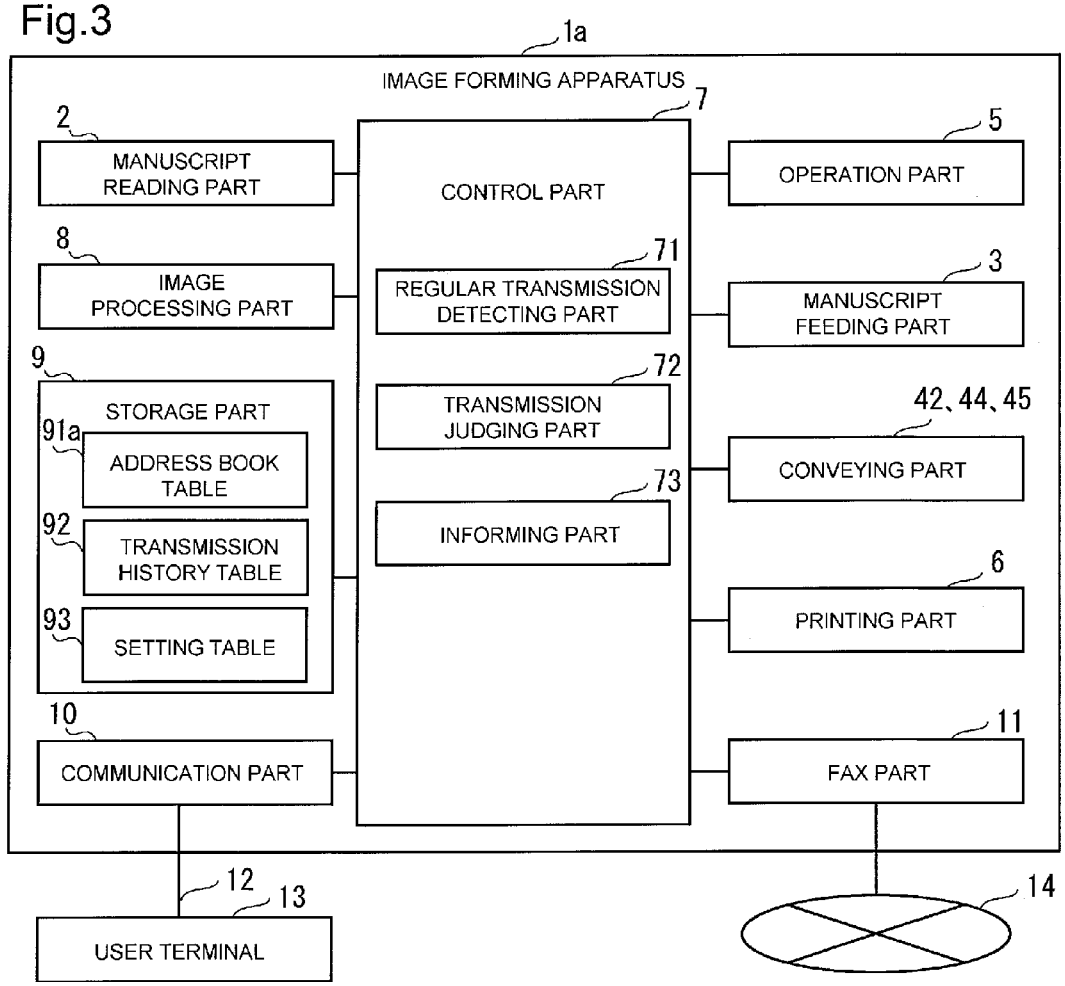
FIG. 3 is a block diagram indicating a schematic structure of the image forming apparatus as shown in FIG. 2.

In FIG. 3, a block diagram indicating the schematic structure of the image forming apparatus 1a is shown. The above-mentioned manuscript reading part 2, the manuscript feeding part 3, the conveying part (the feed roller 42, the conveying roller 44, and the ejection roller 45), the operation part 5, and the printing part 6 are connected to a control part 7. Also, operation of each part is controlled by the control part 7. Also, an image processing part 8, a storage part 9, a communication part 10, and a fax part 11 are connected to the control part 7. Also, the image forming apparatus 1a and a user terminal 13 comprise a facsimile system.

The control part 7 is an information processing part having a non-transitory recording medium. A control program for controlling operation of the image forming apparatus 1a is memorized in the recording medium of the control part 7. The control part 7 reads and expands the control program memorized in the recording medium. Thereby, the control part 7 controls whole device according to instruction information inputted from the operation part 5. Also, in the present embodiment, the control part 7 functions as a regular transmission detecting part 71, a transmission judging part 72, and an informing part 73. The regular transmission detecting part 71 detects a regular transmission from a transmission history as described later. The transmission judging part 72 judges whether or not the regular transmission is transmitted. The informing part 73, if the regular transmission is not transmitted, notifies that effect.

The image processing part 8 performs a predetermined image process to the image data. For example, a rotating process, a scaling process, a gradation adjustment and a density control for image improvement process, or the like is carried out.

The storage part 9 is a non-transitory recording medium. The storage part 9 memorizes the image data acquired by reading the manuscript MS with the manuscript reading part 2. Also, various kinds of management information is memorized in the storage part 9.

In the storage part 9, an address book table 91a, a transmission history table 92, and a setting table 93 are memorized. As described later, in the address book table 91a, the destination number of a transmission destination, or the like are registered. In the transmission history table 92, a transmission history is accumulated for every transmission. In the setting table 93, a set value of a check function of the regular transmission is registered.

The communication part 10 has a function that transmits and receives various data to the user terminal 13, such as a personal computer, via a networks 12, such as LAN. The communication part 10 may transmit and receive various data to the user terminal 13 via an Internet network.

The fax part 11 has a modem and includes a facsimile transmitting function and a facsimile reception function. The facsimile transmitting function is a function that generates a facsimile signal from the image file being read with the manuscript reading part 2 and being filed, and transmits the generated facsimile signal to a telephone network 14. The facsimile reception function is a function that receives a facsimile signal from the telephone network 14, and generates an image file from the received facsimile signal. The image file generated with reception performed by the facsimile reception function is memorized in the storage part 9 or is recorded on the recording paper P by the printing part 6. The fax part 11 may transmit and receive the facsimile signal via the Internet network (hereafter, it is called "Internet FAX".).

Subsequently, a fax transmitting operation of the image forming apparatus 1a is explained.

When a user sets manuscript MS to the manuscript mounting part 31 of the manuscript feeding part 3 and instructs reading of the manuscript image by the operation part 5, the control part 7 accepts a setup of a transmission destination of a facsimile. The control part 7 may receive the transmission destination where the user is selected from the address book tables 91a as the transmission destination of the facsimile. As shown in FIG. 4, for every management number, a destination name, a destination number, classification, and a mail address of a contact (transmitting source) are associated with and registered into the address book table 91a. Here, the destination name is a name of the transmission destination. Also, the destination number is a number or character according to the destination name and the classification. The classification indicates a normal FAX transmission, an Internet FAX transmission (I-FAX), or the like. In the present embodiment, the mail address of the contact (transmitting source) is a mail address of a point of contact of the user as a sender. The mail address of this point of contact of the user (transmitting source) may be a mail address set up in order to report that performing of the job is completed at the time of the completion of the transmission. Also, the Control part 7 receives a setup of transmission time. When the control part 7 becomes transmission time, it will transmit the manuscript image read by the manuscript reading part 2 to a transmission destination via the fax part 11.

When the Fax part 11 transmits a manuscript image, a transmission history is accumulated in the transmission history table 92 as shown in FIG. 5. A transmission destination (management number), transmission time, a time zone of the transmission, and a transmission day of the week are accumulated in the transmission history. In the transmission history table 92, a transmission history at a particular time, such as "2013/10/31 12:00:00 Thursday" as is the current time is accumulated, for example. In the transmission history table 92, the transmission destination is expressed with the management number registered into the address book table 91a. The time zone of the transmission is denoted as a divided time zone, which one day is divided into time zones for a predetermined period. Here, one day is divided in four time zones, such as a morning, an afternoon, an evening, and a midnight to an early morning. In addition, if a transmission date corresponds to a holiday, it is described as a holiday.

Subsequently, the check function of the regular transmission of the image forming apparatus 1a is explained.

A setup of the check function of the regular transmission is instructed via the operation part 5. Then, the control part 7 displays a regular transmission check function setting screen 81 on the liquid crystal display part 51, as shown in FIG. 6. The regular transmission check function setting screen 81 includes a reference period setting item 81a, a cycle setting item 81b, a check interval setting item 81c, and a number-of-times (threshold) setting items 81d, and report destination setting item 81e. The reference period setting item 81a is an item for setting up a period of the transmission history to refer. The cycle setting item 81b is an item for setting up the periodical transmission period of the regular transmission. The check interval setting item 81c is an item for setting up the interval that checks the regular transmission. The number-of-times (threshold) setting items 81d is an item for setting up a number of times of transmission equals or greater than in the period as judged as the regular transmission. The report destination setting item 81e is an item for setting up the report destination of the checked result of the regular transmission.

In the reference period setting item 81a, one week, one month, two months, or the like can be chosen. Here, one month is set.

In the cycle setting item 81b, one day, one week, one month, or the like, can be selected. Here, one week is set.

Figure 7A:
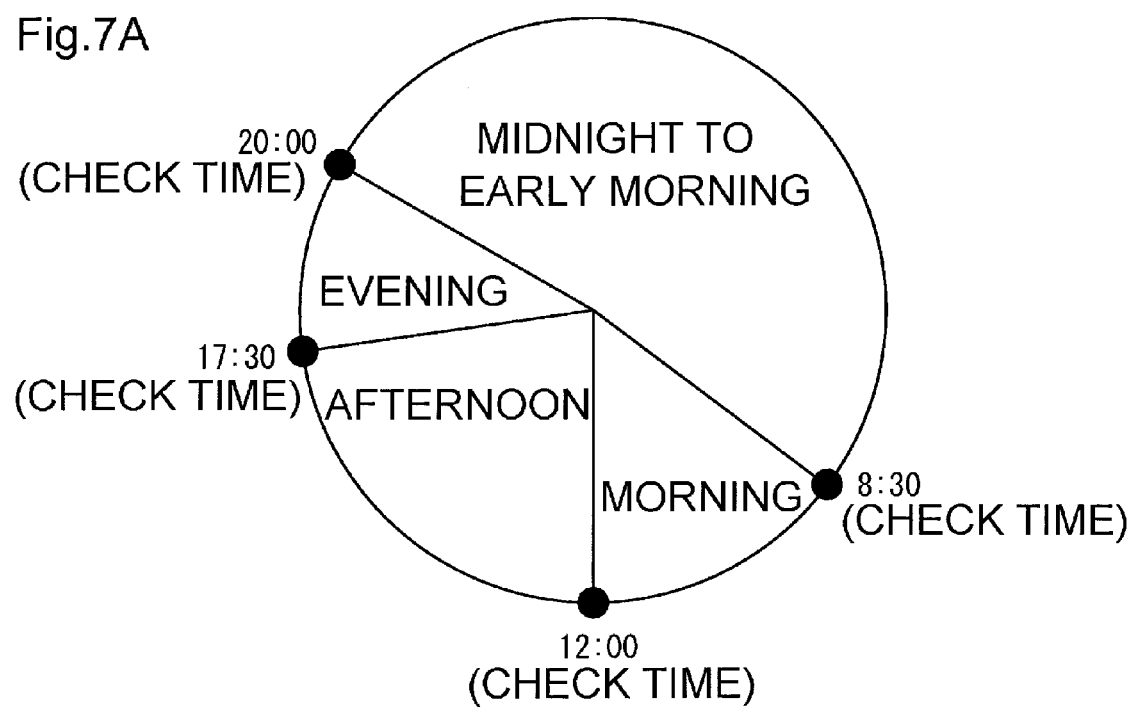
FIG. 7A is an image figure indicating a check interval set up in the check function setting screen of a regular transmission as shown in FIG. 6.

In the check interval setting item 81c, a check interval per day can be chosen. Here, as one day is divided into four, such as the morning, the afternoon, the evening, and the midnight to early morning, checking at intervals of the divided time zone is set up. For example, as shown in FIG. 7A, the time zone "morning" is 08:30 to 11:59, the time zone "afternoon" is 12:00 to 17:29, the time zone "evening" is 17:30 to 19:59, and the time zone of "midnight to early morning" is 20:00 to 08:29. A check of the regular transmission is carried out whenever the time zone, which are the morning, the afternoon, the evening, and the midnight to early morning, changes. As shown in black dots (.), "8:30", "12:00", "17:30", and "20:00" are the checking times. In the check interval setting item 81c, checking at intervals of a predetermined time zone period can be set other than the above example. As a setup, one hour, two hours, or the like, can be selected. For example, if the check interval is set up in one hour as shown in FIG. 7B, for example, the check of the regular transmission is carried out with one hour interval based on 0:00. That is, a check is carried out for every time indicated in a black dot (.).

In the number-of-times (threshold) setting items 81d, the number of times to be judged as regular transmission (threshold), which is the number how many times equals or greater than transmissions in the past exists, can be set up. Here, three times is set up. In the report destination setting item 81e, the report destination that notifies the checked result of the regular transmission can be set up. Here, the transmission source address is setup. The transmission source address is associated with the address book table 91a. The transmission source address is a mail address of the contact (transmitting source) corresponding to the address judged to be the regular transmission. To others, for the report destination setting item 81e, the mail address of the administrator of the image forming apparatus 1a, the mail address previously set up for a notice of a checked result of the regular transmission, or the like, can be set.

When each setting item is set up in the check function setting screen 81 of the regular transmission, the control part 7 registers the set value into the setting table 93. As some regular transmissions, which a cycle or the like are different, can be checked, it can be registered a plurality of setup of the regular transmissions in the check function.

When the check function of the regular transmission is set up, as shown in FIG. 8, the regular transmission detecting part 71 of the control part 7 supervises whether the current time is the check time based on the check interval memorized in the setting table 93 (Step s11). Check time is timing that changes the time zone of the check interval memorized in the setting table 93.

When the current time becomes the check time (Yes in Step s11), the regular transmission detecting part 71 judges whether the reference period memorized in the setting table 93 is one week, one month, or two months (Step s12). If the reference period is one week, the regular transmission detecting part 71 chooses the transmission history for one week before the check time within the transmission histories of the transmission history table 92 (Step s13). If the reference period is one month, the regular transmission detecting part 71 chooses the transmission history for one month before the check time within the transmission histories of the transmission history table 92 (Step s14). If the reference period is two months, the regular transmission detecting part 71 chooses the transmission history for two months before the check time within the transmission histories of the transmission history table 92 (Step s15). In this way, the regular transmission detecting part 71 narrows down the latest transmission history corresponding to the reference period from the transmission history table 92. Thereby, the first transmission history is chosen.

Then, the regular transmission detecting part 71 judges whether the cycle memorized in the setting table 93 is one day, one week, or one month (Step s16). If the cycle is one day, it is in the state where the first transmission history is chosen, and a process progresses to Step s19. If the cycle is one week, the regular transmission detecting part 71 chooses a transmission history of the day of the week same within the first transmission history as check time (Step s17). If the cycle is one month, the regular transmission detecting part 71 chooses a transmission history of the date same within the first transmission history as check time (Step s18). In this way, the regular transmission detecting part 71 narrows down the transmission history corresponding to the cycle based on the date of check time within the first transmission history. Thereby, the second transmission history is chosen.

Then, the regular transmission detecting part 71 judges whether the check interval memorized in the setting table 93 is one hour, or the morning, the afternoon, the evening, and the midnight to early morning (Step s19). Although the case where a check interval is one hour, or the morning, an afternoon, the evening, and the midnight to early morning as an example here is shown, the same process is carried out even if it is other check intervals. If the check interval is one hour, the regular transmission detecting part 71 chooses the transmission history for one hour just before the check time (Step s20). If the check interval is the morning, the afternoon, the evening, and the midnight to early morning, the regular transmission detecting part 71 chooses the transmission history of the time zone just before the time zone of the morning, the afternoon, the evening, and the midnight to early morning including check time (Step s21). Thus, the regular transmission detecting part 71 narrows down, within the second transmission history, the transmission history of the time zone just before the time zone when the check time is included in the time zone corresponding to the check interval. Thereby, the third transmission history is chosen.

In addition, the third transmission history is a same time zone, such as the morning in 10/24, the morning in 10/31, or the like, for example. However, a plurality of dates may be included according to the cycle.

Then, the regular transmission detecting part 71 counts the transmission number of times for every address from the third selected transmission history (Step s22). The regular transmission detecting part 71 chooses the address, which the counted value memorized in the setting table 93 is equal to or greater than the number of times (threshold) (Step s23). The selected address is an address of the regular transmission. In addition, although not illustrated, if there is no address, which the counted value memorized in the setting table 93 is equal to or greater than the number of times (threshold,) the present process is completed. Also, the address that becomes equal to or greater than the number of times (threshold) only in the transmission history of the same day will not be selected because the address is not the regular transmission.

Then, the transmission judging part 72 of the control part 7 judges, for today, whether or not any transmission exists to this address in the time zone (as the time zone corresponding to the check interval) just before the time zone when the check time is included (is it in the transmission history?) (Step s24). That is, it is judged whether regular transmission was carried out to this address to the time zone from the last check time to just before this check time. In case (No in Step s24) that no transmission exists (it is not exist in the transmission history), the informing part 73 of the control part 7 transmits cautions mail to the transmission origin of the report destination memorized in the setting table 93, which is this address (Step s25).

For example, an example case is explained that the set value is memorized in the setting table 93 as the reference period is one month, the cycle is one week, the check interval is the morning, the afternoon, the evening, and the midnight to early morning, the number of times (threshold) is three times, and the report destination is the transmission source address. Here, in the case that the current time is "2013/10/31 12:00:00 Thursday", the transmission history being judged as the regular transmission by the transmission history table 92 as shown in FIG. 5 is a transmission history 92a as shown in FIG. 9. As the transmission history 92a is referred to, about an address "001" for today, there is no transmission in the time zone "morning" (08:30 to 11:59) just before the time zone "afternoon" when the check time "12:00:00" is included. Therefore, the address book table 91a as shown in FIG. 4 is referred to, and the contact (the transmitting source) "AAA@BBB.com" corresponding to the transmission destination (management number) "001" is specified as the mail address of the report destination.

FIG. 10 shows an example of the cautions mail.

A cautions mail 83a is transmitted from the mail address (1B4F_FAX@BBB.com) of the image forming apparatus 1a to the mail address (AAA@BBB.com) for the report destination. The cautions mail 83a describes "<<Cautions>> For today, please verify there is no forgetfulness of regular transmission to address B (066-000) for every week, Thursday, and morning. over."

If the transmission judging part 72 judges as having the transmission (it is in a transmission history), or if the cautions mail 83a is transmitted by the informing part 73 (Yes in step s24, and step s25), the transmission judging part 72 judges whether there is any next address that the counted value memorized in the setting table 93 within the third transmission history is greater than or equal to the number of times (threshold) (Step s26). If there is the next address (Yes in Step s26), the process is return to Step s22. If there is no next address (No in Step s26), the present process is completed.

As explained above, in a typical technology, in case that transmission instruction, such as transmission time and a transmission destination of a regular transmission has forgotten to be set to a FAX machine, FAX cannot be send to the transmission destination.

On the other hand, in the first embodiment, the regular transmission detecting part 71 considers, within the transmission histories, the transmission applicable to the conditions set up by the regular transmission check function is the regular transmission; the transmission judging part 72 judges whether or not exists a transmission to the address judged as the regular transmission in the time zone just before the check time; and if there is no transmission, the informing part 73 tells the cautions mail 83a about there being the no regular transmission to the specific report destination set previously. Therefore, according to the present embodiment, it can prevent a transmission forgetfulness of the regular transmission. Thereby, for example, for business to which order must be applied by FAX every day, opportunity loss can be prevented both an order side and an order-received sides by ordering omission.

The present disclosure is not limited to the first embodiment mentioned above, and it cannot be overemphasized that it can change of all sorts in the range that does not deviate from the aim of the present disclosure.

For example, it may have a transmission execution part that performs, in case that transmission judging part 72 judges as the regular transmission being not transmitted, automatic facsimile transmission of a predetermined manuscript image previously associated for every transmission destination and memorized in the storage part 9 to a transmission destination.

In case that the contact (transmitting source) is not registered into the address book table 91a, a mail address of the administrator previously registered into the image forming apparatus 1 may serve as the report destination. Also, in case that the facsimile transmission instruction is carried out by the user who logged in the image forming apparatus 1, as the contact (transmitting source) corresponding to the transmission destination in the control part 7, a mail address of the login user may be registered into the contact (transmitting source) of the address book table 91a.

Also, an address book table for the notice of the checked result may be memorized in the storage part 9 other than the address book table 91a. In the address book table for the notice of the checked result, an address (destination number), the time zone of transmission, the transmission day of the week, and the contact (transmitting source) may be associated. In a check function setting screen, as a report destination, the contact (transmitting source) of the address book table for the notice for the checked result can be selected. Accordingly, it can be supported if the transmission destination of regular transmission, the user who carries out a transmission instruction for every transmission destination, the transmission time zone, and the transmission day of the week are different.

Also, the control part 7 includes mail address of the login user in the transmission history, accumulate it in the transmission history table 92, refers to the transmission history table 92 for every predetermined time, and generates the histogram according to the login user for every transmission destination, and the contact (transmitting source) of the address book table 91a or the address book table for the notice for the checked result may be updated to the mail address of the login user with the highest transmission frequency. Also, the control part 7 generates, in the case of the address book table for the notice of the checked result, based on the transmission history table 92, the histogram according to the login user for every transmission destination, the transmission time zone, and the transmission day of the week, and the contact (transmitting source) may be updated to the mail address of the login user with the highest transmission frequency. Also, when the informing part 73 transmits the cautions mail, the transmission history table 92 is referred to, and, for every transmission destination or for every transmission destination, transmission time zone, and transmission day of the week, the mail address of the login user with the highest transmission frequency may be specified, and it may notify to the mail address of the specified login user. Accordingly, the report destination can be determined without setting the address book table 91a or the address book table for the notice of the checked result.

[Second Embodiment]

Subsequently, as refer to FIG. 11-FIG. 18, the technology that enables to prevent a reception forgetfulness of regular reception by using an image forming apparatus 1b related to a second embodiment of the present disclosure when performing FAX reception from a specific sender is explained.

That is, in the above-mentioned first embodiment, the transmitting side checks transmission forgetfulness of the regular transmission. Comparatively, in the second embodiment, the receiving side checks reception forgetfulness of a regular reception.

Figure 11:
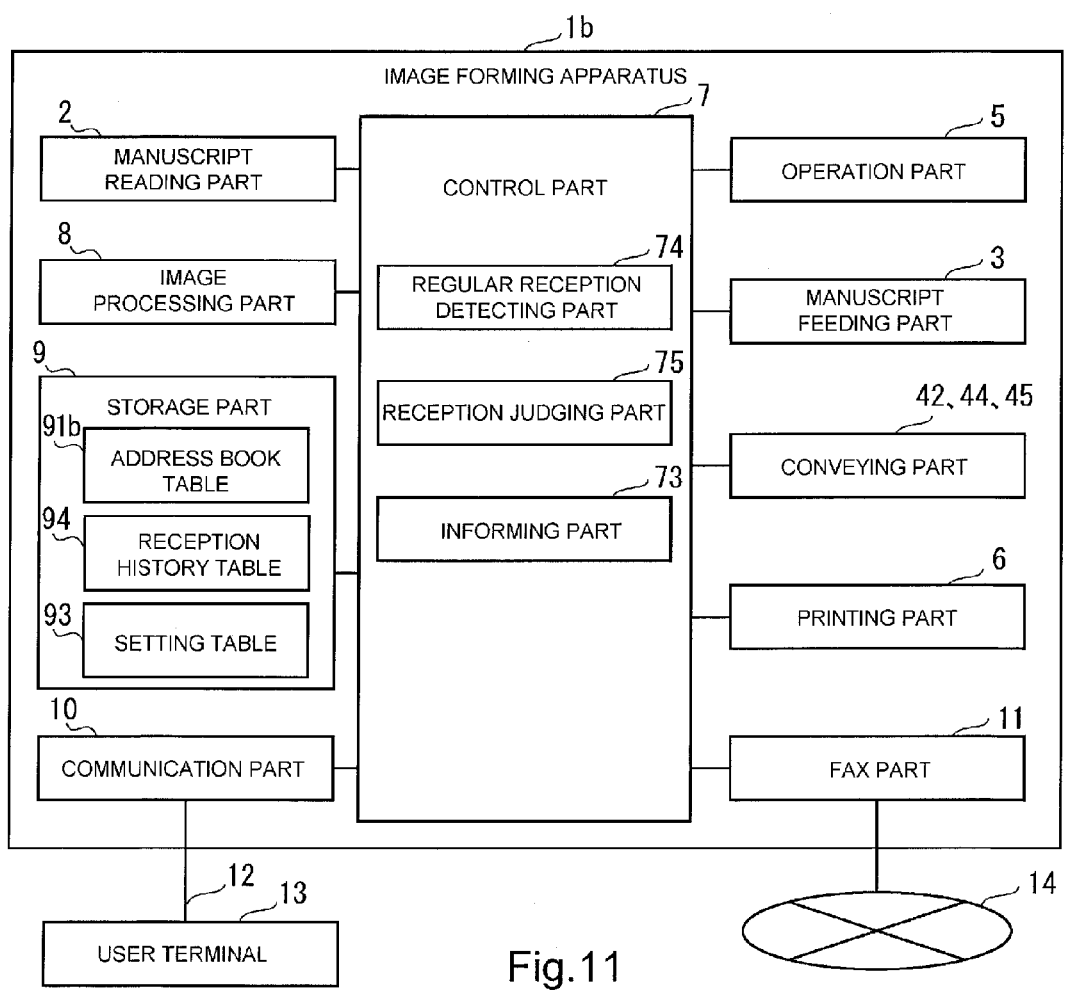
FIG. 11 is a block diagram indicating a schematic structure of an image forming apparatus related to a second embodiment of the present disclosure.

Firstly, as refer to FIG. 11, the schematic structure of the image forming apparatus 1b related to the second embodiment of the present disclosure is described. The image forming apparatus 1b of the second embodiment differs in the composition of the control part 7 and the storage part 9 as compared with the image forming apparatus 1a (FIG. 3) of the first embodiment. That is, the image forming apparatus 1a and the image forming apparatus 1b may be the same about appearance and an internal configuration. Therefore, although the same numerals in FIG. 11 as the numerals shown in FIG. 3 may be the same configuration, operations may differ. Also, the image forming apparatus 1b and the user terminal 13 comprise a facsimile system.

Also, the control part 7 functions as the informing part 73 and a regular reception detecting part 74, and a reception judging part 75, as described latter. The regular reception detecting part 74 detects the regular reception from a reception history. The reception judging part 75 judges whether or not the regular reception is received. The informing part 73 notifies, if the regular reception is not received, that effect.

Also, in the storage part 9, an address book table 91b, a setting table 93, and a reception history table 94 are memorized. In the address book table 91*b*, a destination number or the like are registered. In the reception history table 94, the reception history is accumulated for every reception. In the setting table 93, a set value of a check function of the regular reception is registered.

According to the second embodiment, when a manuscript image is received by fax part 11, it will be accumulated in the reception history table 94 shown in FIG. 12 as the reception history. The reception history includes a sender (management number), a reception time, a time zone of the reception, and a reception day of week. In the reception history table 94, for example, the reception history of a particular time, such as "2013/10/31 12:00:00 Thursday," is accumulated as a current time. In the reception history table 94, the sender is denoted by a management number registered in the address book table 91*b*. Also, the time zone of the reception is denoted by a divided time zone, which one day is divided into time zone for a predetermined period. Here, one day is divided in four time zones, such as a morning, an afternoon, an evening, and a midnight to early morning. In addition, if a reception date corresponds to a holiday, it is described as a holiday.

Then, a check function of the regular reception of the image forming apparatus 1*b* is explained.

Figure 13:
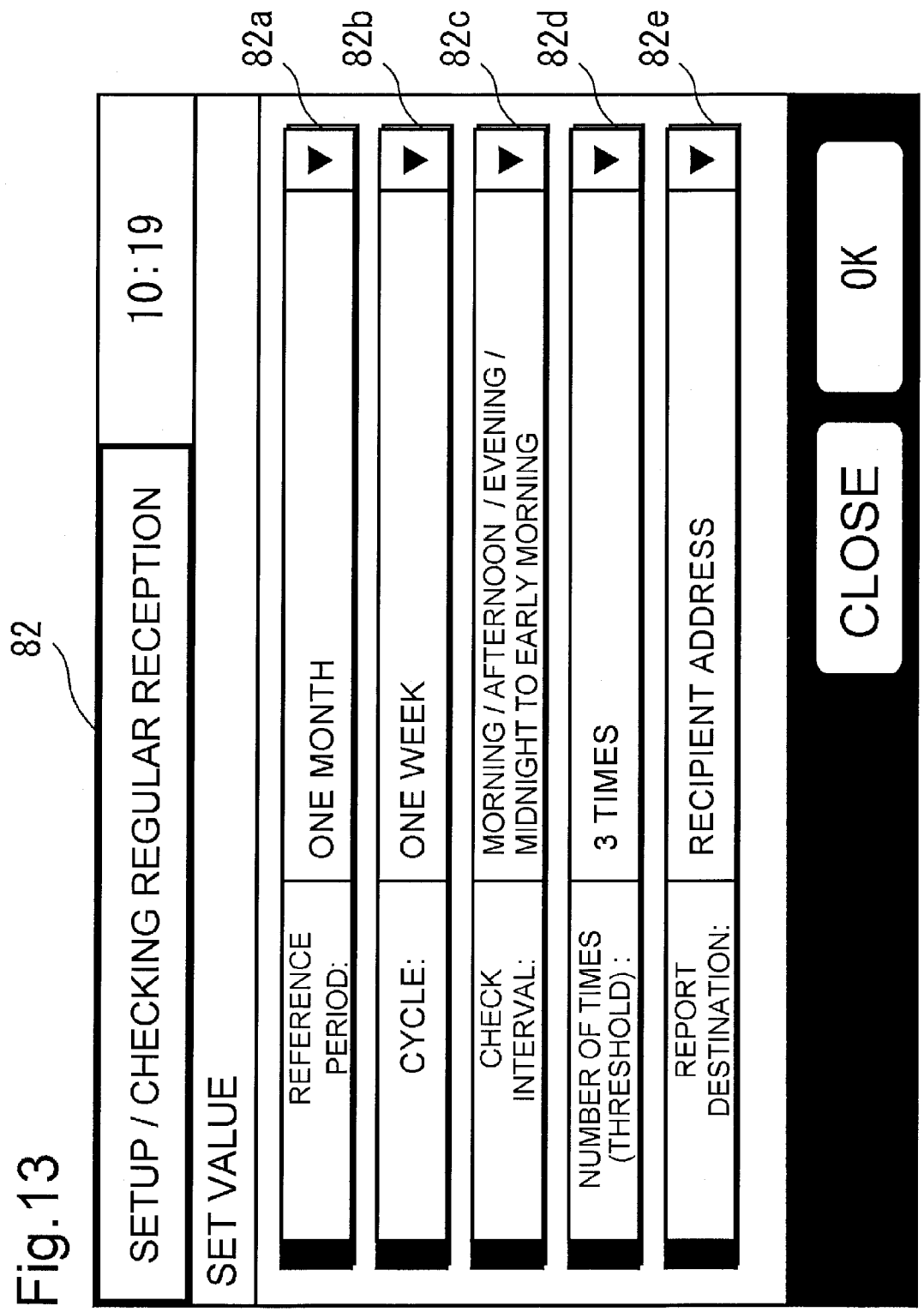
FIG. 13 shows an example of a check function setting screen of a regular reception displayed on an operation part as shown in FIG. 11.

A setup of the check function of the regular reception is instructed by the operation part 5. Then, the control part 7 shows a check function setting screen 82 of the regular reception as shown in FIG. 13 on the liquid crystal display part 51. In the check function setting screen 82 of the regular reception, a reference period setting item 82*a*, a cycle setting item 82*b*, a check interval setting item 82*c*, and a number-of-times (threshold) setting items 82*d*, and a report destination setting item 82*e* are included. The reference period setting item 82*a* is an item for setting up a period of the reception history to refer to. The cycle setting item 82*b* is an item for setting up a periodical receiving period of the regular reception. The check interval setting item 82*c* is an item for setting up an interval that checks the regular reception. The number-of-times (threshold) setting items 82*d* is an item for setting up a number of times of the reception equals and greater than as judged as the regular reception. The report destination setting item 82*e* is an item for setting up the report destination of the checked result of the regular reception.

In the reference period setting item 82*a*, one week, one month, two months, or the like, can be selected. Here, one month is set up.

In the cycle setting item 82*b*, one day, one week, one month, or the like, can be chosen. Here, one week is set up.

Figure 14A:
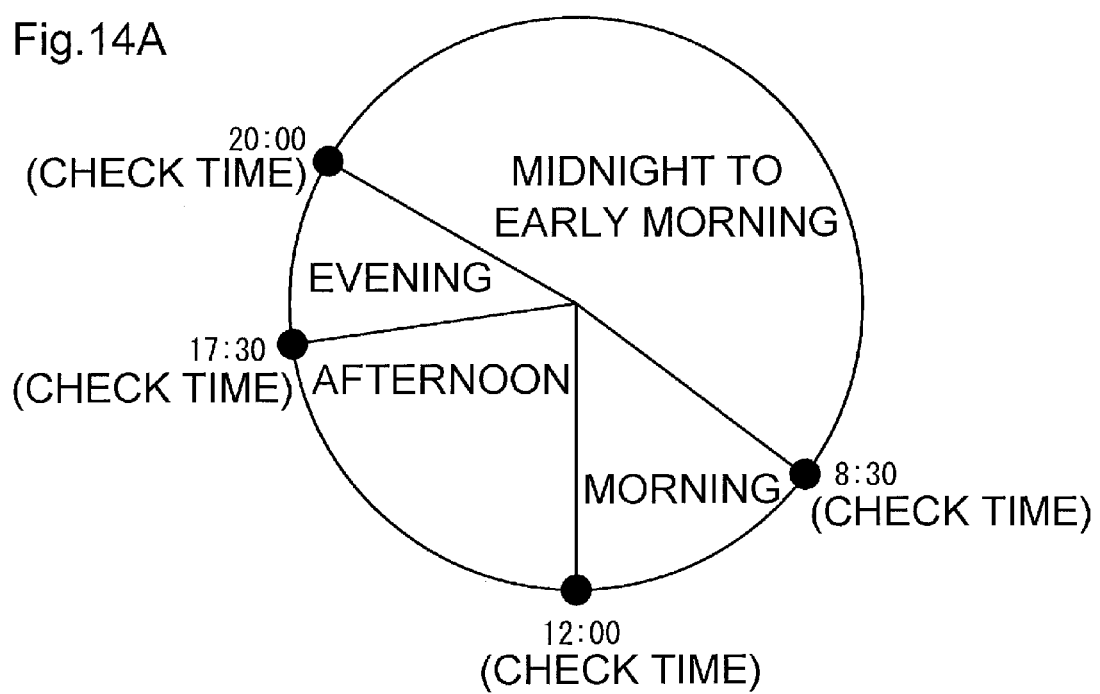
FIG. 14A is an image figure indicating a check interval set up in the check function setting screen of a regular reception as shown in FIG. 13.

In the check interval setting item 82*c*, a check interval per day can be chosen. Here, as one day is divided into four, such as the morning, the afternoon, the evening, and the midnight to early morning, checking at intervals of the divided time zone is set up. For example, as shown in FIG. 14A, the time zone "morning" is 08:30 to 11:59, the time zone "afternoon" is 12:00-17:29, and the time zone "evening" is 17:30-19:59, and the time zone "midnight to early morning" is 20:00 to 08:29. A check of the regular reception is carried out whenever the time zone, which are the morning, the afternoon, the evening, and the midnight to early morning, changes. As shown in black dots (.), "8:30", "12:00", "17:30", and "20:00" are the checking times. In the check interval setting item 82*c*, checking at intervals of a predetermined time zone period can be set other than the above example. For example, one hour, two hours, or the like, can be selected. As an example, as shown in FIG. 14B, in case that the check interval is set up in one hour, the check of the regular reception is carried out with one hour interval based on 0:00, for example. That is, a check is carried out for every time indicated in a black dot (.).

In the number-of-times (threshold) setting items 82*d*, the number of times to be judged as regular reception (threshold), which is the number how many times equal or greater than receptions in the past exists, can be set up.

Figure 15:
FIG. 15 shows an example of an address book table as shown in FIG. 11.

Here, three times is set up. In the report destination setting item 82*e*, the report destination that notifies the checked result of the regular reception can be set up. Here, the recipient address is set up. The recipient address is associated with the address book table 91*b*, and it is a mail address of the contact corresponding to the number of the sender of the regular reception to be judged. For example, as shown in FIG. 15, for every management number, a transmitting person name, a destination number, classification, and the mail address of the contact of the user (recipient) are associated with and registered into the address book table 91*b*. The transmitting person name is a name of the sender in the present embodiment. The destination number is a destination number according to transmitting person name and the classification of FAX. The classification is the classification of FAX. The mail address of contact of the user (recipient) may be a mail address set up to report a completion of a job, such as facsimile reception. In addition, a mail address of an administrator of the image forming apparatus 1*b*, a mail address previously set up for the notice of the checked result of the regular reception, or the like, can be set for the report destination setting item 82*e*.

The control part 7 registers the set value into the setting table 93, when each setting item is set up in the check function setting screen 82 for the regular reception. To check several regular reception, which the cycle or the like differs, a plurality of the check function setup of the regular reception can be registered.

When the check function of the regular reception is set up, as shown in FIG. 16, the regular reception detecting part 74 of the control part 7 checks whether the current time is the check time based on the check interval memorized in the setting table 93 (Step s11). The check time is timing that changes the time zone of the check interval memorized in the setting table 93.

When the current time turns into the check time (Yes in Step s11), the regular reception detecting part 74 judges whether or not the reference period memorized in the setting table 93 is one week, one month, or two months (Step s12). If the reference period is one week, the regular reception detecting part 74 chooses the reception history for one week before the check time within the reception histories of the reception history table 94 (Step s13). If the reference period is one month, the regular reception detecting part 74 chooses the reception history for one month before the check time within the reception histories of the reception history table 94 (Step s14). If the reference period is two months, the regular reception detecting part 74 chooses the reception history for two months before the check time within the reception histories of the reception history table 94 (Step s15). In this way, the regular reception detecting part 74 narrows down the latest reception history corresponding to the reference period from the reception history table 94. Thereby, the first reception history is chosen.

Then, the regular reception detecting part 74 judges whether or not the cycle memorized in the setting table 93 is one day, one week, or one month (Step s16). If the cycle is one day, it is in the state where the first reception history is chosen, and a process progresses to Step s19. If the cycle is one week, the regular reception detecting part 74 chooses the reception history of a day of the week same within the first reception history as check time (Step s17). If the cycle is one month, the regular reception detecting part 74 chooses the reception history of a date same within the first reception history as check time (Step s18). In this way, the regular reception detecting part 74 narrows down the reception history corresponding to the cycle based on the date of check time within the first reception history. Thereby, the second reception history is chosen.

Then, the regular reception detecting part 74 judges whether the check interval memorized in the setting table 93 is one hour, or the morning, the afternoon, the evening, and the midnight to early morning (Step s19). Although the case where a check interval is one hour, or the morning, an afternoon, the evening, and the midnight to early morning as an example here is shown, the same process is carried out even if it is other check intervals. If the check interval is one hour, the regular reception detecting part 74 chooses the reception history for one hour just before the check time (Step s20). If the check interval is the morning, the afternoon, the evening, and the midnight to early morning, the regular reception detecting part 74 chooses the reception history of the time zone just before the time zone of the morning, an afternoon, the evening, and the midnight to early morning including the check time (Step s21). In this way, the regular reception detecting part 74 narrows down, within the second reception history, the reception history of the time zone just before the time zone when check time is included in the time zone corresponding to the check interval. Thereby, the third reception history is chosen.

Although the third reception history is a same time zone, such as the morning in 10/24, the morning in 10/31, or the like, for example. However, a plurality of dates may be included according to the cycle.

Then, the regular reception detecting part 74 counts the reception times for every sender from the third selected reception history (Step s22). The regular reception detecting part 74 chooses the sender, which the counted value memorized in the setting table 93 is equal to or greater than the number of times (threshold) (Step s23). This selected sender is the sender of the regular reception. Although not illustrated, in case that there is no sender, which the counted value memorized in the setting table 93 is equal to or greater than the number of times, the present process is completed. Also, the sender who sends greater than or equal to the number of times (threshold) only according to the reception history of the same day will not be selected because the sender is not for the regular reception.

Then, the reception judging part 75 of control part 7 judges, for today, whether or not the reception exists from this sender in the time zone (time zone corresponding to a check interval) just before the time zone when check time is included (is it in the reception history?) (Step s24). That is, it is judged whether or not the regular reception from this sender is carried out in the time zone from the last check time to just before this check time. In case that there is no reception (No in Step s24) (it is not exist in the reception history), the informing part 73 of control part 7 transmits the cautions mail to the report destination memorized in the setting table 93, that is, the contact of the recipient corresponding to this sender, (Step s25).

For example, an example case is explained that the set value is memorized in the setting table 93 as the reference period is one month, the cycle is one week, the check interval is the morning, the afternoon, the evening, and the midnight to early morning, the number of times (threshold) is three times, and the report destination is the recipient address. Here, when the current time is "2013/10/31 12:00:00 Thursday", the reception history judged to be the regular reception is a reception history 94a shown in FIG. 17 from the reception history table 94 shown in FIG. 12. As the reception history 94a is referred to, about a sender "001" for today, there is no reception in the time zone "morning" (08:30 to 11:59) just before the time zone "afternoon" when the check time "12:00:00" is included. Therefore, the address book table 91b shown in FIG. 15 is referred to, and the contact "AAA@BBB.com" corresponding to the sender (management number) "001" is specified as the mail address of the report destination.

FIG. 18 shows an example of a cautions mail. A cautions mail 83b is transmitted from the mail address (1B4F_FAX@BBB.com) of the image forming apparatus 1b to the mail address (AAA@BBB.com) of the report destination. The cautions mail 83b describes "<<Cautions>> For today, please verify there is no forgetfulness of regular reception from sender B (066-000) for every week, Thursday, and morning. over."

The reception judging part 75 judges, if the case where it judges the reception exists (it is in the reception history), and if the cautions mail 83b is transmitted by the informing part 73 (Yes in step s24, and step s25), within the third reception history, whether there is any next sender who has the counted value equal to or greater than the number of times (threshold) memorized in the setting table 93 (Step s26). If there is the next sender (Yes in Step s26), the process returns to Step s22, and if there is no next sender (No in Step s26), the present process is completed.

As explained above, in a typical technology, if a user of a transmitting side has forgotten to set a transmission instruction, such as transmission time and a transmission destination, to a FAX machine, FAX is not transmitted. Therefore, the user of a receiving side does not notice that a FAX for the regular reception is not received.

On the other hand, the present embodiment, the regular reception detecting part 74 considers that the reception applicable to the conditions set up by the regular reception check function within the reception histories; the reception judging part 75 judges whether or not the reception from the sender for the regular reception exists in the time zone just before the check time; and if there is no reception, the informing part 73 tells the cautions mail 83b that there is no regular reception the specific report destination set previously.

Therefore, according to the present embodiment, it can prevent forgetfulness of a reception that is regular reception. Thereby, for example, about business to which order must be applied by FAX every day, opportunity loss can be prevented both an order side and an order-received sides by ordering omission.

The present disclosure is not limited to the second embodiment mentioned above, and it cannot be overemphasized that it can change of all sorts in the range that does not deviate from the aim of the present disclosure.

For example, it may have a transmission forgetfulness informing part that notifies transmission forgetfulness. If the reception judging part 75 judges that the regular reception is not received, the transmission forgetfulness informing part transmits a facsimile of a predetermined manuscript image for telling transmission forgetfulness, which is previously associated for each sender and memorized in the storage part 9, is automatically performed to a sender.

Also, if the contact is not registered into the address book table 91b, a mail address of an administrator, which is previously registered into the image forming apparatus 1b may serve as a report destination. Also, if the facsimile reception instructions are carried out by a user who logged in to the image forming apparatus 1b, the control part 7 may register a mail address of a login user into the contact of the address book table 91*b* as the contact corresponding to the sender.

Also, other than the address book table 91*b*, an address book table for the notice of the checked result that associated with the sender (destination number), the receiving time zone, the reception day of the week, and the contact may be memorized in the storage part 9. In the check function setting screen, it is selectable in the contact of the address book table for the notice of the checked result as the report destination. Accordingly, it can be supported if the sender of the regular reception, the receiving time zone, and the user who receives for every reception day of the week are different.

Also, the control part 7 may be include a mail address of the login user in the reception history, accumulate it in the reception history table 94, and refers to the reception history table 94 for every predetermined time, generates a histogram according to login user for every sender, and updates the contact of the address book table 91*b* or the address book table for the notice of the checked result to the mail address of the login user with the highest receiving frequency. Also, in the case of the address book table for the notice of a checked result, based on the reception history table 94, the control part 7 may create the histogram according to the login user for every sender, receiving time zone, and reception day of the week, and may update a contact to the mail address of a login user with the highest receiving frequency. Also, in case that the informing part 73 transmits cautions mail, with reference to the reception history table 94, for every sender, or for every sender, receiving time zone, and reception day of the week, the mail address of the login user with the highest receiving frequency may be specified, and it may notify to the mail address of the login user. Accordingly, the report destination can be determined without using the address book table 91*b* or the address book table for the notice of the checked result.

What is claimed is:

1. A facsimile apparatus, comprising:
a transmission history table that is accumulated a transmission history including a transmission destination and transmission time for every facsimile transmission;
an information processor; and
a non-transitory recording medium comprising a control program that causes the information processor to:
detect, in time zones set up previously, the time zone of a regular transmission being carried out based on the transmission history;
judge, in the time zone of the regular transmission detected, whether or not the regular transmission is carried out in the detected time zone for today based on the transmission history; and
inform, if the regular transmission is judged as being not carried out, a predetermined report destination about the regular transmission being not carried out.

2. The facsimile apparatus according to claim 1, wherein the information processor, in case that one day is previously divided in the time zones corresponding to a predetermined check interval, at a time of an end of each time zone, narrows down, within transmission histories accumulated in the transmission history table, to a first transmission history corresponding to a predetermined reference period, narrows down to a second transmission history corresponding to a predetermined cycle based on the time of the end within the first transmission history, narrows down to a third transmission history corresponding to an ended time zone within the second transmission history, and detects a communication to the transmission destination transmitted equal to or more than a predetermined number of times as the regular transmission within the third transmission history.

3. The facsimile apparatus according to claim 1, further comprising
an address book table that registers the transmission destination and a mail address of the report destination, wherein
the informing step comprises notifying to the mail address of the report destination corresponding to the transmission destination of the regular transmission judged as being not carried.

4. The facsimile machine according to claim 3, wherein, when a facsimile transmission to the transmission destination is instructed by a login user, as a mail address of the report destination, a mail address of the login user is registered to the address book table corresponding to the transmission destination.

5. The facsimile machine according to claim 1, further comprising
an address book table that registers the transmission destination, the divided time zone corresponding to the transmission time, a transmitting day of the week, and a mail address of the report destination and is for noticing a checked result, wherein
the informing step comprises notifying the mail address of the report destination corresponding to the transmission destination, the time zone, and the transmission day of the week of the regular transmission judged as being not carried out.

6. The facsimile machine according to claim 1, wherein
in the transmission history, a mail address of a login user who carried out facsimile transmission instruction is included, and the information processor refers to the transmission history table and notifies the mail address of the login user with a highest transmission frequency in the transmission destination of the regular transmission judged as being not carried out.

7. The facsimile apparatus according to claim 1, wherein the facsimile apparatus transmits, when the regular transmission is judged as not being carried out, a manuscript image memorized previously to the transmission destination of the regular transmission.

8. A facsimile apparatus, comprising:
a message receiving history table that accumulates a reception history including a sender and reception time for every facsimile reception;
an information processor; and
a non-transitory recording medium comprising a control program that causes the information processor to:
detect, in time zones set up previously, the time zone of a regular reception being carried out based on the reception history;
judge, in the time zone of the regular reception being detected, whether or not the regular reception is carried out in the detected time zone for today based on the reception history; and
inform, if the regular reception is judged as being not carried out, a predetermined report destination about the regular reception being not carried out.

9. The facsimile apparatus according to claim 8, wherein the information processor, in case that one day is previously divided in the time zones corresponding to a predetermined check interval, at a time of an end of each time zone, narrows down, within reception histories accumulated in the reception history table, to a first reception history corresponding to a predetermined reference period, narrows down to a second reception history corresponding to a predetermined cycle based on the time of the end within the first reception history, narrows down to a third reception history corresponding to an ended time zone within the second reception history, and detects a communication from the sender received equal to or more than a predetermined number of times as the regular reception within the third reception history.

10. The facsimile apparatus according to claim 8, further comprises
an address book table that registers the sender and a mail address of the report destination, wherein
the informing step comprises notifying the mail address of the report destination corresponding to the sender of the regular reception judged as being not carried out by the reception judging part.

11. The facsimile apparatus according to claim 10, wherein,
when the facsimile reception from the sender is instructed by a login user, as a mail address of the report destination, a mail address of the login user is registered to the address book table corresponding to the sender.

12. The facsimile apparatus according to claim 8, further comprising
an address book table that registers the sender, the divided time zone corresponding to the reception time, the reception day of the week, and the mail address of the report destination and is for noticing a checked result, wherein
the informing step comprises notifying the mail address of the report destination corresponding to the sender, the time zone, and the reception day of the week of the regular reception judged as being not carried out.

13. The facsimile apparatus according to claim 8, wherein
in the reception history, a mail address of the login user who carried out facsimile reception instructions is included, and
the information processor refers to the reception history table and notifies to the mail address of the login user with a highest receiving frequency in the sender of the regular reception judged as not being carried out.

14. The facsimile apparatus according to claim 8, wherein
the facsimile apparatus transmits, when the regular reception is judged as being not carried out, a manuscript image, which is memorized previously and tells transmission forgetting to the sender of the regular reception.

15. A facsimile system having a user terminal and a facsimile apparatus, wherein the facsimile apparatus comprises:
a transmission history table that is accumulated a transmission history including a transmission destination and transmission time for every facsimile transmission;
an information processor; and
a non-transitory recording medium comprising a control program that causes the information processor to:
detect, in time zones set up previously, the time zone of a regular transmission being carried out based on the transmission history;
judge, in the time zone of the regular transmission detected, whether or not the regular transmission is carried out in the detected time zone for today based on the transmission history; and
inform, if the regular transmission is judged as being not carried out, a predetermined report destination about the regular transmission being not carried out.

\* \* \* \* \*